Oct. 27, 1936.  L. L. DOLLINGER  2,058,669
AIR FILTER
Original Filed Oct. 26, 1932  2 Sheets-Sheet 1
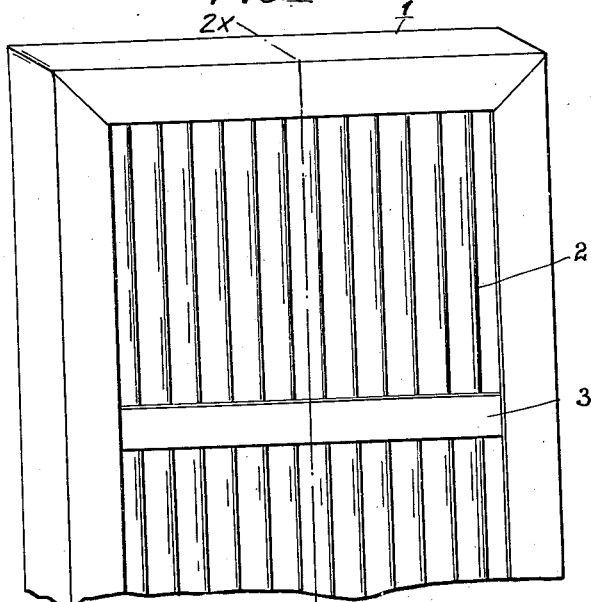
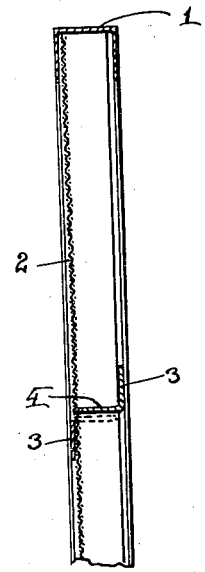
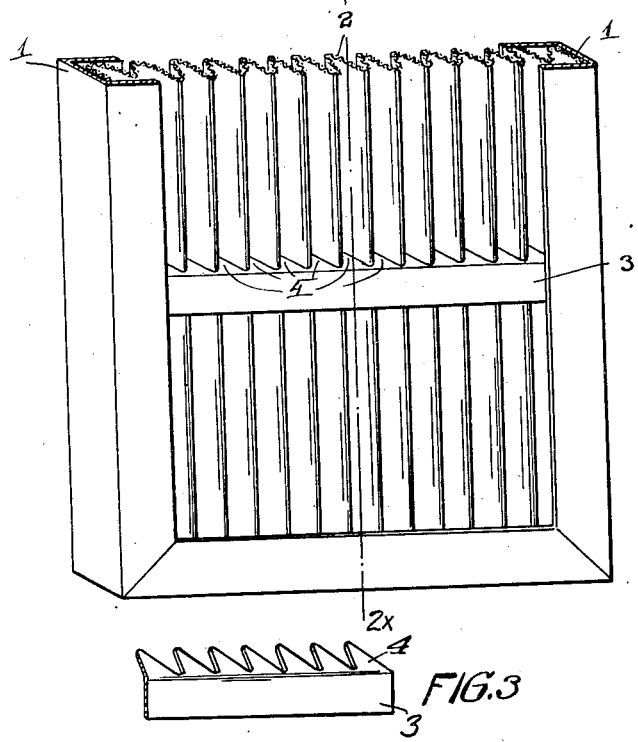
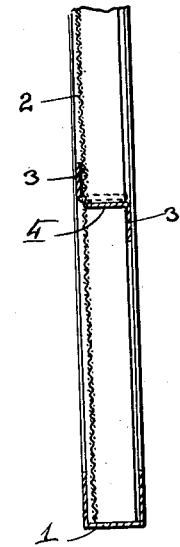
INVENTOR
LEWIS L. DOLLINGER
BY
ATTORNEY Oct. 27, 1936.   L. L. DOLLINGER   2,058,669
AIR FILTER
Original Filed Oct. 26, 1932   2 Sheets-Sheet 2
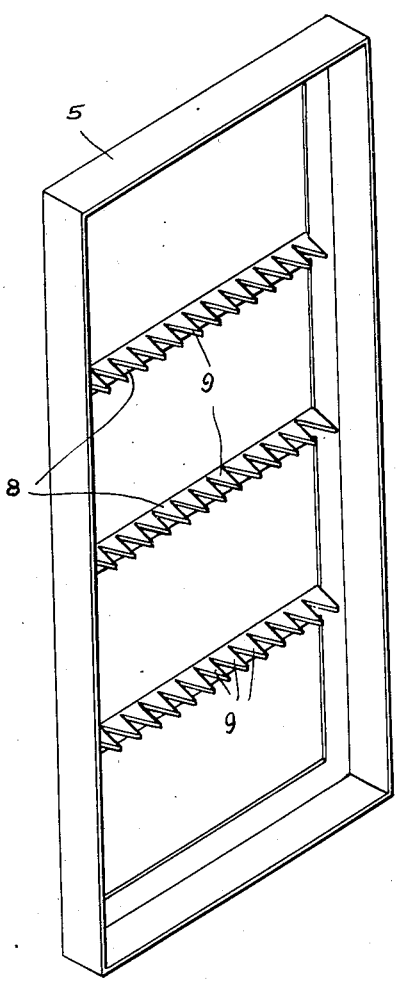
FIG. 4.
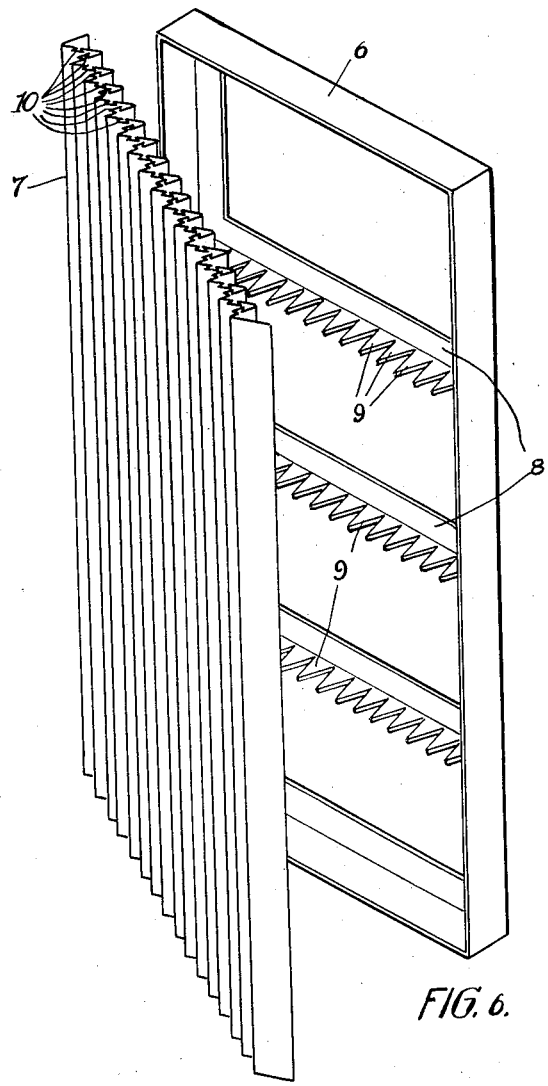
FIG. 6.
FIG. 5.
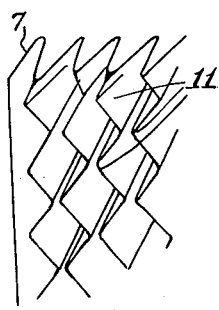
FIG. 7.
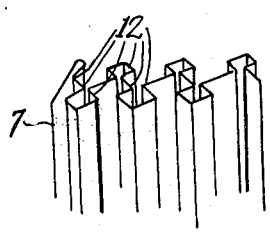
FIG. 8.
INVENTOR
LEWIS L. DOLLINGER
BY
ATTORNEY Patented Oct. 27, 1936

2,058,669

UNITED STATES PATENT OFFICE 2,058,669

AIR FILTER

Lewis L. Dollinger, Rochester, N. Y., assignor to Staynew Filter Corporation, Rochester, N. Y.

Original application October 26, 1932, Serial No. 639,669. Divided and this application March 13, 1935, Serial No. 10,873

13 Claims. (Cl. 183—71)

This invention relates to air and gas filters and has for its object to provide novel filtering panels of inexpensive and simple construction and high efficiency with which filters of any desired capacity can be built in a minimum space and at a minimum cost.

Another object of this invention is to so construct the filtering panels that they can be removably mounted in a frame and when dirt laden readily replaced by new filtering panels.

All these and other objects of this invention and attendant advantages will become more readily apparent from the detailed description thereof which follows, reference being had to the accompanying drawings in which Figure 1 is a perspective view of one of the filtering panels partly broken away.

Figure 2 is a vertical section thereof taken on the line 2x—2x of Figure 1.

Figure 3 is a perspective view of a portion of one of the combined bracing and spacing members used in the filtering panels.

Figure 4 is a detail perspective view of one-half of a panel frame showing a modified construction for the filtering panels.

Figure 5 is a detail perspective view of a modified form of the folded filtering sheet for the filtering panel.

Figure 6 is a detail perspective view of the other half of the panel frame making up the modified form of filtering panel.

Figure 7 is a detail perspective view of a portion of the filtering sheet provided with modified folds therein.

Figure 8 is a detail perspective view of a portion of the filtering sheet with other modified folds therein.

This application is a division from application Serial No. 639,669 filed October 26, 1932.

In the several figures of the drawings like reference numerals indicate like parts.

The filtering panel forming the subject matter of my present invention comprises a frame which is rectangular in outline and is preferably made up of cardboard channels 1, 1 which are suitably fastened together at the corners to provide a frame which is open at the front and back. The frame may also be made up from a continuous length of channel which is suitably cut and bent to form the desired rectangular shape. The cardboard stock from which the frame is made is sufficiently heavy to provide rigidity for the panel frame. Within the frame is mounted the filtering medium which consists of a thin filtering cloth 2 which is sized or otherwise treated so as to give it rigidity and stiffness. Folding the filtering cloth in the manner illustrated further increases the rigidity of the filtering sheet so that it will withstand the pressure of the air in its passage therethru. Folding the filtering cloth also increases the filtering area to the extent that the filtering panel thus formed will efficiently filter air or gases at a low velocity.

The filtering cloth is cemented to the inside of the channel members of the panel frame to seal the joint between the filtering cloth and the frame which surrounds it. In order to hold the forms of the filtering cloth uniformly spaced in the panel a series of spacing bars 3, 3 are provided at the open front and back of the panels. These spacing bars, as illustrated in perspective in Figure 3, are provided by a strip of cardboard with a series of fingers 4, 4 projecting therefrom on one side thereof. The fingers are bent at right angles so that they project between the folds of the filtering cloth and hold them uniformly spaced apart. The spacing bars are cemented to the inside of the panel frame and in resting against the top of the folds brace the folds against the pressure of the air which passes therethru. The spacing bars are provided at the open front and back of the panels at suitable intervals in such a manner that the fingers 4, 4 of opposing spacing bars are substantially opposite each other and are located on one bar at the bottom edge thereof and on the other bar at the top edge thereof. The natural tendency of the fingers to straighten out from their right angle position on the bars thus causes the fingers of opposing bars to move together instead of moving away from each other. This arrangement of the fingers also increases the rigidity of the filtering cloth which adds to the mechanical resistance of the filter against the pressure under which the air or gas is forced therethru.

In Figures 4 to 8 inclusive I have illustrated a modified form of construction for the filter panel. In this construction the panel frame is made up of two half sections 5 and 6 in the form of two shallow cardboard boxes which have their bottom cut out and are adapted to be telescoped together with the filtering sheet 7 between them. As illustrated in the figures each of the panel frame sections is cut out so as to provide the cross or spacing members 8, 8 integral therewith. On these spacing members are provided the spacing fingers 9, 9 which are bent inwardly to project between the folds of the filtering sheet when the filtering sheet is placed in the panel frame section. As illustrated the spacing fingers are provided at the lower edge of the cross members on one of the panel frame sections and at the upper edge on the cross members of the other panel frame section. In this way the spacing fingers of opposite panel frame sections are spaced so as not to interfere with each other.

In fastening the filtering sheet into the panel frame section, the edges of the filtering sheet are coated with a suitable cement while the filtering sheet is held expanded to its proper size and shape. With the filtering sheet thus held and its edges coated one of the panel frame sections is telescoped over the filtering sheet so that the coated edges of the filtering sheet make contact with the inside of the sides of the frame section and adhere thereto to provide a sealed joint between the edges of the filtering sheet and the panel frame sections over the entire perimeter of the filtering sheet. The panel frame section with the filtering sheet in place within it is then telescoped into the other panel frame section with a suitable cement placed between the sides of the sections. The edges of the two panel sections are thus sealed and the sections held firmly together so that all of the air entering the frame of the panel will have to pass thru the filtering sheet held supported therein.

The filtering sheet may be folded so as to increase the filtering area of the folds thereof. In Figure 5 I have illustrated a portion of the side of each vertically arranged V shaped fold folded upon itself to provide parallel dove tailed channels 10 within the V shaped folds. These channels not only materially increase the filtering area of each fold but are arranged in such a manner that opposing channels make contact and brace each other so as to prevent the pressure of the air passing thru the folds from collapsing the folds.

In Figure 7 I have illustrated another method of folding the V shaped folds of the filtering sheet in order to increase the filtering area thereof and keep the folds from collapsing. In this form the sides of the V shaped folds are corrugated horizontally by V shaped corrugations 11 which face each other to give the filtering sheet the appearance of a honey comb. The V shaped corrugations which face each other between the folds thus keep the folds spaced and prevent them from collapsing.

In the modified form of the filtering sheet illustrated in Figure 8, V shaped spacing corrugations 12 are provided longitudinally thru the V shaped folds and these corrugations are so arranged that their outer edges are located opposite each other between the folds of the filtering sheet to have them brace each other when forced together by the pressure of the air passing thru the filtering sheet.

I claim:

1. A filtering panel comprising an open frame composed of channel shaped members providing a continuous channel around the inner side of the frame, a flexible filtering sheet having parallel folds formed therein, the edges of said filtering sheet extending into said channel to have the folds extend across said channel and have the edges of said filtering sheet held sealed therein, a combined spacing and bracing member extending across said frame to connect opposing sections of said channel intermediate of the frame and spacing fingers projecting from said combined spacing and bracing member to brace said filtering sheet and keep its folds uniformly spaced.

2. A filtering panel comprising an open frame composed of channel shaped members providing a continuous channel around the inner side of the frame, a flexible filtering sheet extending across said frame into said channel, parallel folds provided in said filtering sheet to have the folds engage opposing sides of said channel to hold the folds parallel to each other.

3. A filtering panel as set forth in claim 2 with combined spacing and bracing means extending across said frame substantially at right angles to the folds in said filtering sheet and means projecting from said combined spacing and bracing means into the folds of said filtering sheet to uniformly space the folds intermediate the ends thereof.

4. A filtering panel comprising an open frame, a filtering sheet extending across the open frame, parallel folds provided in said filtering sheet, a spacing bar extending across the open frame at the front and a spacing bar extending across the open frame at the back thereof both substantially at right angles to the parallel folds of said filtering sheet intermediate the ends thereof and spacing means projecting into said folds of said filtering sheet from said spacing bars with the spacing means of one spacing bar projecting into the folds provided on one side of the filtering sheet and the spacing means of the other spacing bar projecting into the folds provided on the opposite side of the filtering sheet.

5. A filter panel comprising a rigid frame, a filtering sheet mounted within said frame, parallel V shaped folds in said filtering sheet and a substantially dove tail shaped channel formed in the sides of the V shaped folds opposite each other.

6. A filter panel comprising a rigid frame, a filtering sheet mounted within said frame, parallel V shaped folds in said filtering sheet and V shaped corrugations in said folds at right angles thereto opposite each other.

7. A filter panel comprising a rigid frame, a filtering sheet mounted within said frame, parallel V shaped folds in said filtering sheet and parallel V shaped corrugations in the sides of said V shaped folds longitudinally thereof and opposite each other.

8. A filtering unit comprising an inner and outer box frame of substantially the same depth and having one side open so as to telescope over each other and form a chamber of substantially the depth of one of the frames between them, the opposing sides of said box frames having openings therein to provide an inlet and outlet for said chamber, a filtering sheet having its edges cemented to the inside of said box frames, said box frames being cemented together to hold said filtering sheet locked between the openings of the box frames.

9. A filtering unit comprising inner and outer box frames of substantially the same depth each having one side open to permit the box frames to telescope over each other and provide a chamber of substantially the depth of one of the frames between them, the opposing sides of said box frames having openings therein to provide an inlet and outlet for said chamber, a filtering sheet having its edges cemented to the inside of one of said box frames, said box frames being cemented together to hold said frames together with the filtering sheet between them, parallel folds formed in said filtering sheet and spacing means extending across the openings in the sides of said box frames and engaging into the folds of both sides of said filtering sheet.

10. A filter panel comprising a pair of open sided narrow frame sections adapted to be telescoped into each other to provide a frame having substantially the depth of but one of said pair of frame sections, a filtering sheet of thin fibrous material having parallel V shaped folds provided therein stretched across the open sides of said frame and sealed with its edges against the inside of one of said frame sections, a spacing bar for each of said frame sections and connecting the sides of their respective sections across the open sides thereof, spacing fingers projecting inwardly from said spacing bars into the folds of said filtering sheet to support said filtering sheet at the front and back intermediate the open sides of the frame sections.

11. A filter panel as set forth in claim 10 with the spacing fingers of one frame section spaced from the spacing fingers of the other frame section.

12. A filtering panel comprising an open ended frame, a thin and flexible filtering sheet having parallel folds stretched across the inside of said frame with its edges sealed to the inside of said frame, a cross member extending across the open sides of said frame at right angles to the parallel folds of said filtering sheet and spacing fingers carried by said cross member to engage into the folds of said filtering sheet from the open sides of the frame to keep the folds of the filtering sheet from expanding on one side and collapsing on the opposite side and to brace the thin filtering sheet against air pressure from either of the open sides of the frame.

13. A filtering panel comprising an open ended frame, a thin and flexible filtering sheet having parallel folds stretched across the inside of said frame with its edges sealed to the inside of the frame, cross members extending across the open sides of said frame intermediate the top and bottom of the open sides of said frame, spacing fingers carried by said cross members and arranged to project into the folds of said filtering sheet from opposite sides and substantially opposite to each other from the open sides of the frame to brace the thin and unsupported filtering sheet against air pressure from either of the open sides of said frame and keep said folds of said filtering sheet from expanding or collapsing on either side thereof.

LEWIS L. DOLLINGER.